(12) United States Patent
Honda

(10) Patent No.: US 7,086,663 B2
(45) Date of Patent: Aug. 8, 2006

(54) SIDE AIR BAG DEVICE

(75) Inventor: Takashi Honda, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 227 days.

(21) Appl. No.: 10/612,487

(22) Filed: Jul. 2, 2003

(65) Prior Publication Data

US 2004/0075254 A1  Apr. 22, 2004

(30) Foreign Application Priority Data

Jul. 8, 2002 (JP) .............................. 2002-198177
Apr. 22, 2003 (JP) .............................. 2003-117460

(51) Int. Cl.
*B60R 21/207* (2006.01)
*B60R 21/26* (2006.01)

(52) U.S. Cl. ................... 280/730.2; 280/736

(58) Field of Classification Search ............... 280/729, 280/730.2, 736, 741, 742
See application file for complete search history.

(56) References Cited

U.S. PATENT DOCUMENTS

| | | | | |
|---|---|---|---|---|
| 4,043,572 A | * | 8/1977 | Hattori et al. ............... 280/738 |
| 4,360,223 A | * | 11/1982 | Kirchoff ....................... 280/729 |
| 5,251,931 A | * | 10/1993 | Semchena et al. ........ 280/730.1 |
| 5,439,248 A | * | 8/1995 | Steffens et al. ........... 280/730.2 |
| 5,464,246 A | | 11/1995 | Castro et al. |
| 5,544,913 A | * | 8/1996 | Yamanishi et al. ....... 280/730.2 |
| 5,556,128 A | * | 9/1996 | Sinnhuber et al. ........ 280/730.2 |
| 5,556,129 A | * | 9/1996 | Coman et al. ............ 280/730.2 |
| 5,630,616 A | * | 5/1997 | McPherson ............... 280/730.2 |
| 5,730,464 A | * | 3/1998 | Hill ........................... 280/743.2 |
| 5,803,485 A | * | 9/1998 | Acker et al. .............. 280/728.2 |
| 5,848,804 A | * | 12/1998 | White et al. .............. 280/743.1 |
| 5,913,536 A | * | 6/1999 | Brown ...................... 280/730.2 |
| 6,029,993 A | * | 2/2000 | Mueller .................... 280/730.2 |
| 6,113,135 A | * | 9/2000 | Tsutsumi .................. 280/730.2 |
| 6,129,380 A | * | 10/2000 | Rink et al. ................... 280/737 |
| 6,349,964 B1 | | 2/2002 | Acker et al. |
| 6,425,602 B1 | * | 7/2002 | Al-Amin et al. .......... 280/730.2 |

FOREIGN PATENT DOCUMENTS

JP  05131889 A  *  5/1993

* cited by examiner

*Primary Examiner*—Paul N. Dickson
*Assistant Examiner*—Laura B. Rosenberg
(74) *Attorney, Agent, or Firm*—Hamre, Schumann, Mueller & Larson, P.C.

(57) ABSTRACT

A gas generated by an inflator is supplied through a branching pipe to first and second air bags, which are deployed from a side of a seat to a space between an inner surface of a side of a vehicle compartment and an occupant. A one-way valve mounted in the branching pipe permits the gas to move from the second air bag to the first air bag and inhibits a back flow of the gas, whereby the internal pressure in the first air bag can be maintained higher than that in the second air bag, to thereby restrain the occupant's waist more strongly than the occupant's breast. Moreover, the gas generated by the single inflator is diverted by the branching pipe and supplied to the two air bags. Therefore, the two air bags can be deployed while minimizing the number of the inflator.

4 Claims, 11 Drawing Sheets

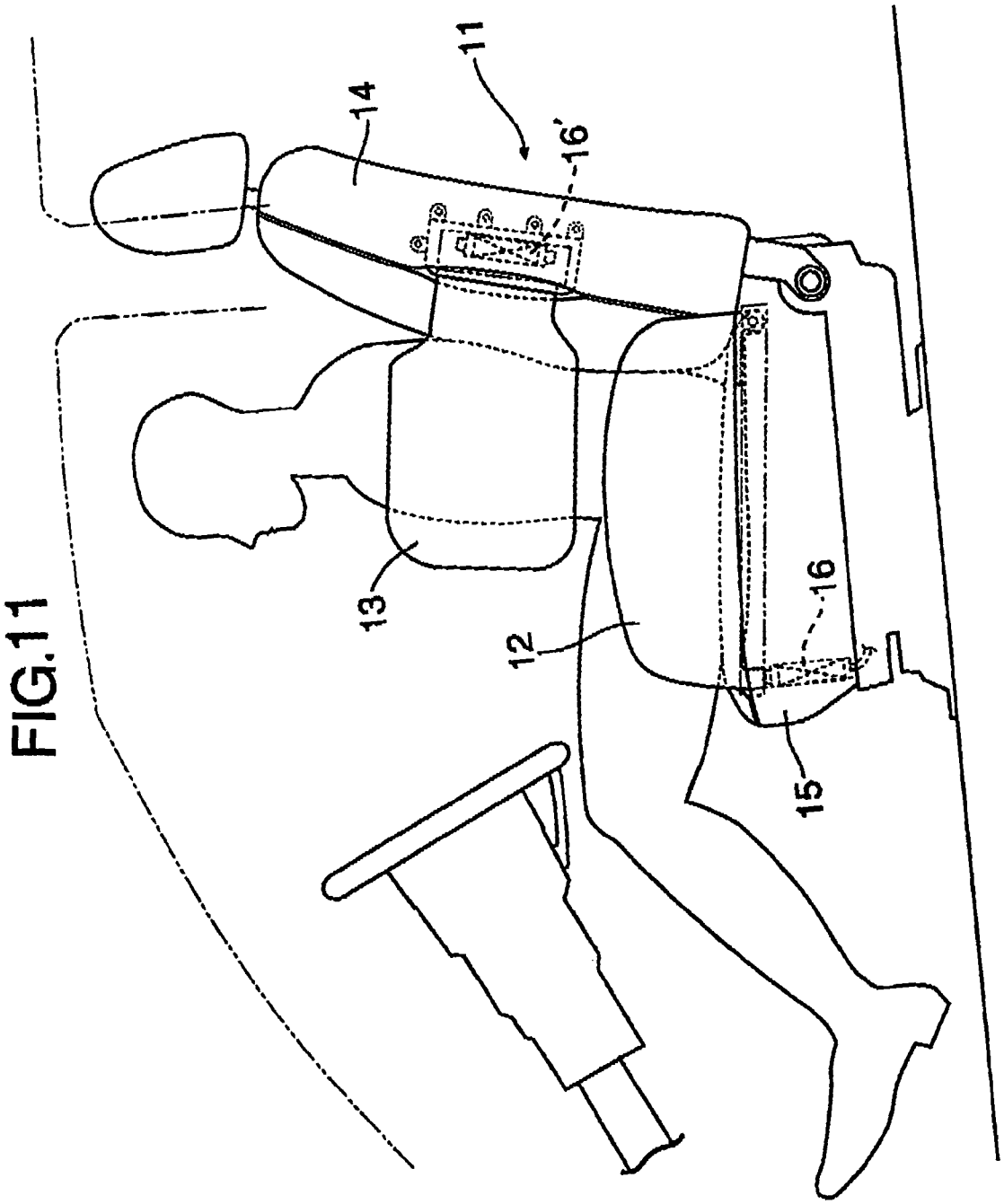

SIDE AIR BAG DEVICE

BACKGROUND OF THE INVENTION

1. Field of the Invention

The present invention relates to a side air bag device comprising a plurality of air bags which are accommodated in folded states in a side of a seat for an occupant and which are expanded by a gas generated by an inflator upon side collision of a vehicle to be deployed between an inner surface of a side of a vehicle compartment and the occupant.

2. Description of the Related Art

A conventional side air bag devices is known, for example, from U.S Pat. No. 5,464,246 and U.S. Pat. No. 6,349,964. An air bag in the side air bag device described in U.S Pat. No. 5,464,246 is formed into a cylindrical shape and adapted to be deployed to connect an upper end of a seat back and a front end of a seat cushion, thereby restraining an occupant's body from a side of the breast to a side of the waist. An air bag in the side air bag device described in U.S Pat. No. 6,349,964 is divided into upper and lower chambers so that an occupant is effectively restrained by setting the internal pressure in the upper chamber at a lower value and the internal pressure in the lower chamber at a higher value.

The side air bag device described in U.S Pat. No. 5,464,246 is provided in each seat and comprises the single air bag having a uniform internal pressure, and hence it is impossible to adjust a restraint force in such a manner that the hardness of the air bag can be varied in correspondence to each site of an occupant's body. On the other hand, the side air bag device described in U.S. Pat. No. 6,349,964 has the following problem: a difference in internal pressure is generated by setting different open areas of openings through which the gas flows from the inflator into the upper and lower chambers, but the internal pressure in the entire air bag eventually becomes uniform, because the two chambers communicate with each other.

SUMMARY OF THE INVENTION

Accordingly, it is an object of the present invention to appropriately set the restraint force of the air bag of the side air bag device in accordance with the positional relationship to the occupant's body.

To achieve the above object, according to a first feature of the present invention, there is provided a side air bag device comprising a plurality of air bags which are accommodated in folded states in a side of a seat for an occupant and which are expanded by a gas generated by an inflator upon side collision of a vehicle to be deployed between an inner surface of a side of a vehicle compartment and the occupant, wherein internal pressures in the plurality of deployed air bags are different from one another.

With the above arrangement, the internal pressures in the plurality of air bags deployed from the side of the seat to a space between the inner surface of the side of the vehicle compartment and the occupant. Therefore, the restraint force of each air bag can be appropriately set in accordance with the positional relationship to the occupant's body.

According to a second feature of the present invention, in addition to the first feature, the gas generated by the single inflator is diverted by a branching pipe and supplied to the plurality of air bags.

With the above arrangement, the gas generated by the single inflator is diverted by a branching pipe and supplied to the plurality of air bags, and hence the plurality of air bags can be deployed while minimizing the number of the inflator.

According to a third feature of the present invention, in addition to the second feature, a one-way valve is mounted in an outlet of the branching pipe communicating with any one of the air bags, thereby inhibiting a back flow of the gas from the one air bag.

With the above arrangement, the one-way valve is mounted in an outlet of the branching pipe communicating with any one of the air bags, and hence the back flow of the gas from the one air bag can be inhibited, whereby the internal pressure in the one air bag can be maintained higher than that in the other air bags.

According to a fourth feature of the present invention, in addition to the third feature, the side air bag device includes a first air bag deployed to a side of a waist of the occupant, and a second air bag deployed to a side of a breast of the occupant, and the one-way valve is mounted on the outlet of the branching pipe communicating with the first air bag.

With the above arrangement, of the first air bag deployed to the side of the occupant's waist and the second air bag deployed to the side of the occupant's breast, the one-way valve is mounted in the outlet of the branching pipe communicating with the first air bag. Therefore, the internal pressure in the first air bag can be maintained higher than that in the second air bag to restrain the occupant's breast more strongly than the occupant's waist.

According to a fifth feature of the present invention, in addition to any of the first to third features, the side air bag device includes a first air bag deployed to a side of a waist of the occupant, and a second air bag deployed to a side of a breast of the occupant, the first air bag being deployed from a seat cushion, and the second air bag being deployed from a seat back.

With the above arrangement, the first air bag is deployed from the seat cushion to the side of the occupant's waist, and the second air bag is deployed from the seat back to the side of the occupant's breast, thereby minimizing an influence to the deployed shapes of the first and second air bags provided by a reclining angle of the seat back with respect to the seat cushion. Especially, because the first air bag is deployed from the seat back, even if the first air bag is made longer in a longitudinal direction, a bearing force against a lateral load can be sufficiently ensured, and the occupant's waist can be further effectively restrained.

According to a sixth feature of the present invention, in addition to the first feature, the plurality of air bags are expanded by the gas supplied from corresponding inflators, respectively.

With the above arrangement, the plurality of air bags are expanded by the gas supplied from th corresponding inflators, respectively, and hence the pressures in the deployed air bags can be differentiated with ease.

A front seat 11 in each of embodiments corresponds to a seat of the present invention, and first and second air bags 12 and 13 in each of the embodiments correspond to the air bags of the present invention.

The above and other objects, features and advantages of the invention will become apparent from the following description of the preferred embodiments taken in conjunction with the accompanying drawings.

BRIEF DESCRIPTION OF THE DRAWINGS

FIGS. 1 to 4B show a first embodiment of the present invention, wherein

FIG. 1 is a side view of a front seat in which a side air bag device is mounted;

FIG. 2 is an enlarged view of a portion indicated by 2 in FIG. 1; and

FIG. 3 is a view taken in a direction of an arrow 3 in FIG. 2;

FIGS. 4A and 4B are views for explaining the operation during deployment of an air bag;

FIGS. 5 to 7B show a second embodiment of the present invention, wherein

FIG. 5 is a perspective view of a branching pipe;

FIG. 6 is a sectional view taken along a line 6—6 in FIG. 5; and

FIGS. 7A and 7B are views for explaining the operation during deployment of an air bag;

FIGS. 8 to 10 show a third embodiment of the present invention, wherein

FIG. 8 is a side view of a front seat in which a side air bag device is mounted;

FIG. 9 is an enlarged view of a portion indicated by 9 in FIG. 8; and

FIG. 10 is a view taken in a direction of an arrow 10 in FIG. 9; and

FIG. 11 is a side view of a front seat in which a side air bag device according to a fourth embodiment is mounted.

DESCRIPTION OF THE PREFERRED EMBODIMENTS

A first embodiment of the present invention will now be described with reference to FIGS. 1 to 4B.

Figure 1:
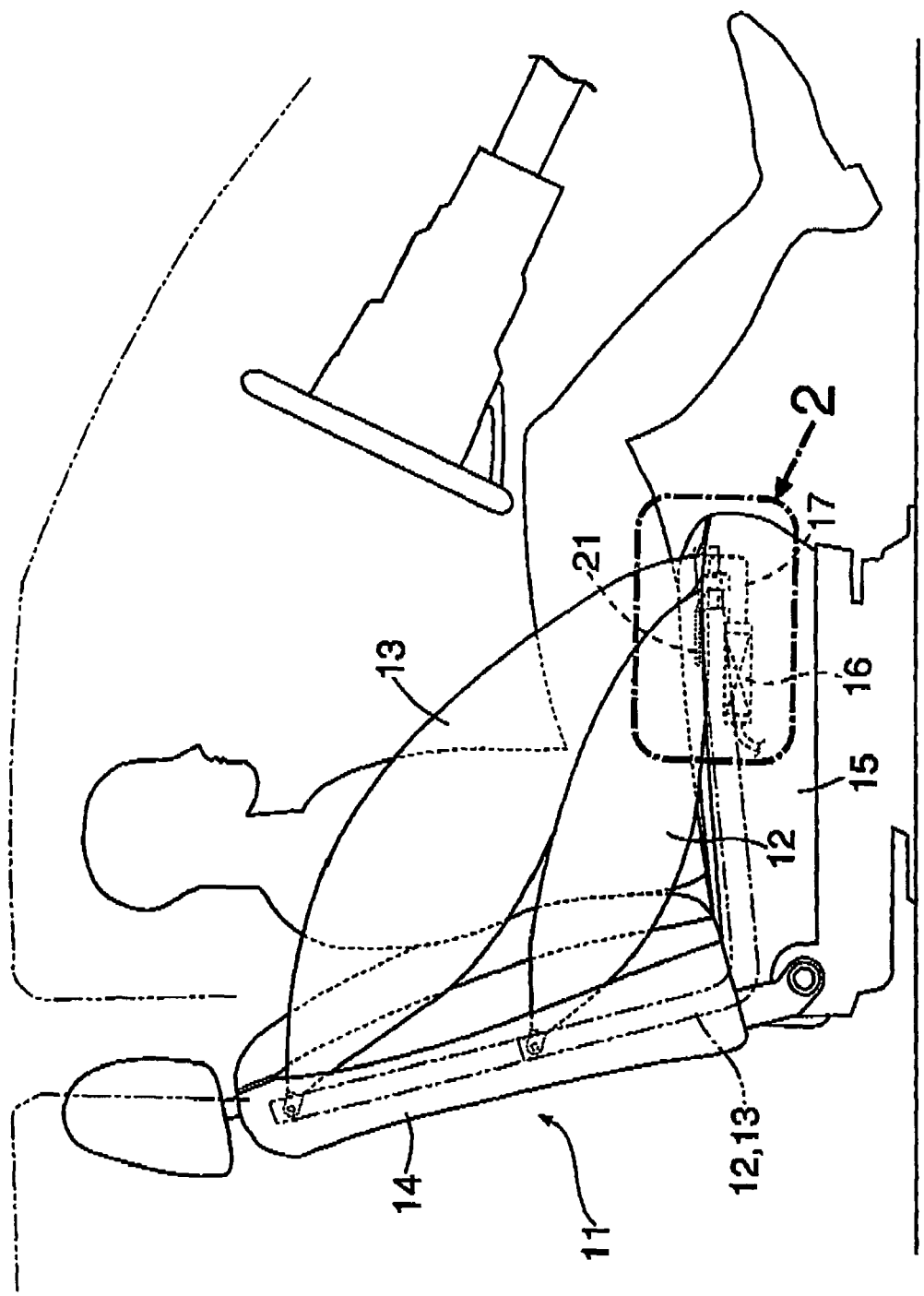

As shown in FIG. 1, a side air bag device is disposed in a right side of a front seat 11 of an automobile, namely, in a side opposed to a front door and a center pillar, and includes a first air bag 12 and a second air bag 13. The first air bag 12 is deployed so that it extends to connect a vertically central portion of the seat back 14 to a front end of a seat cushion 15, and protects a side of a waist of an occupant. The second air bag 13 is deployed so that it extends to connect an upper end of a seat back 14 to the front end of the seat cushion 15, and protects a side of a breast of the occupant. The first and second air bags 12 and 13 in folded states before deployment are embedded in the right sides of the seat back 14 and the seat cushion 15, as shown by dashed lines, and are each deployed in such a manner that it breaks a sewn portion of a skin of the front seat 11 by a pressure of expansion.

Figure 2:
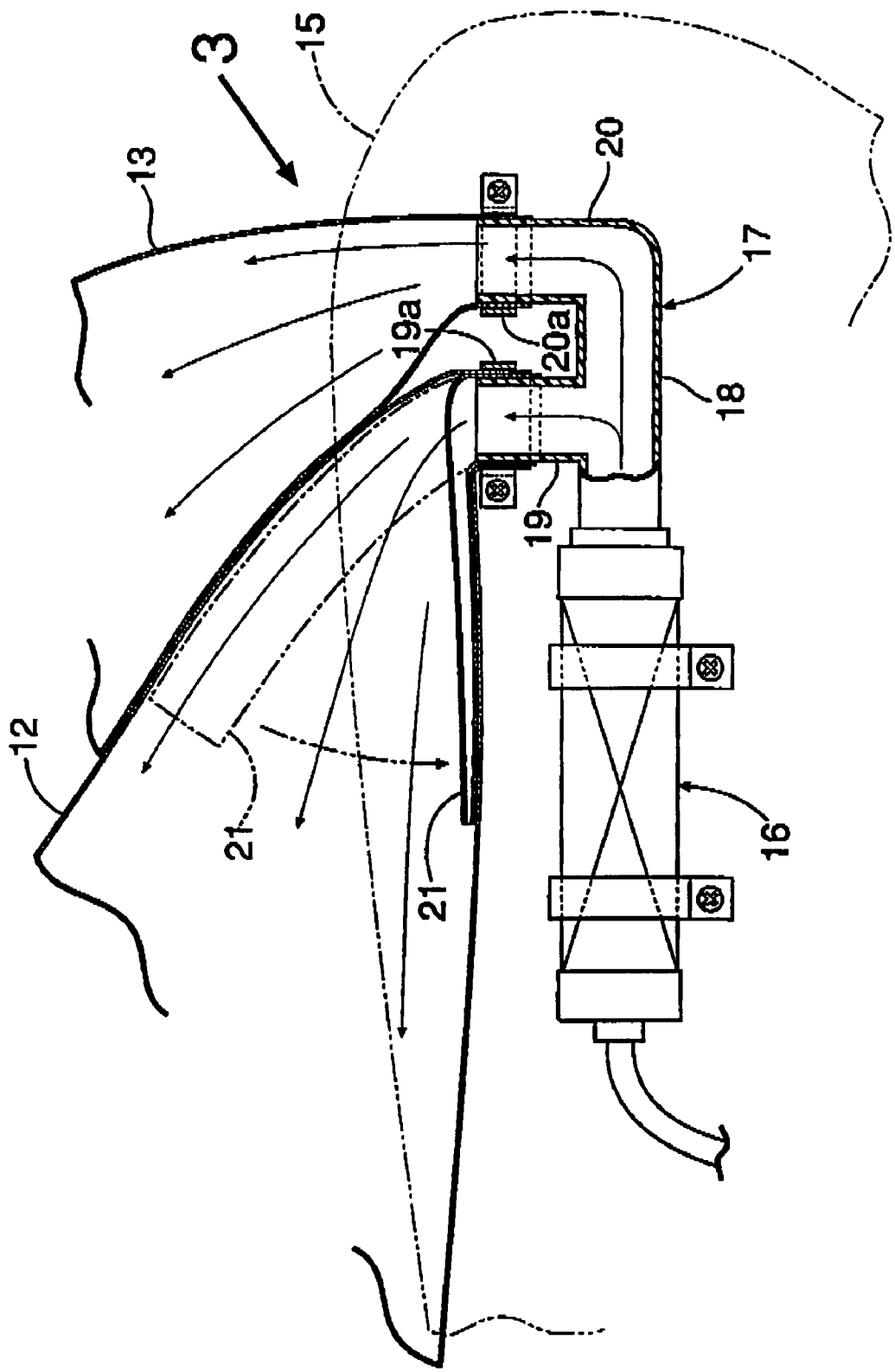
Figure 3:
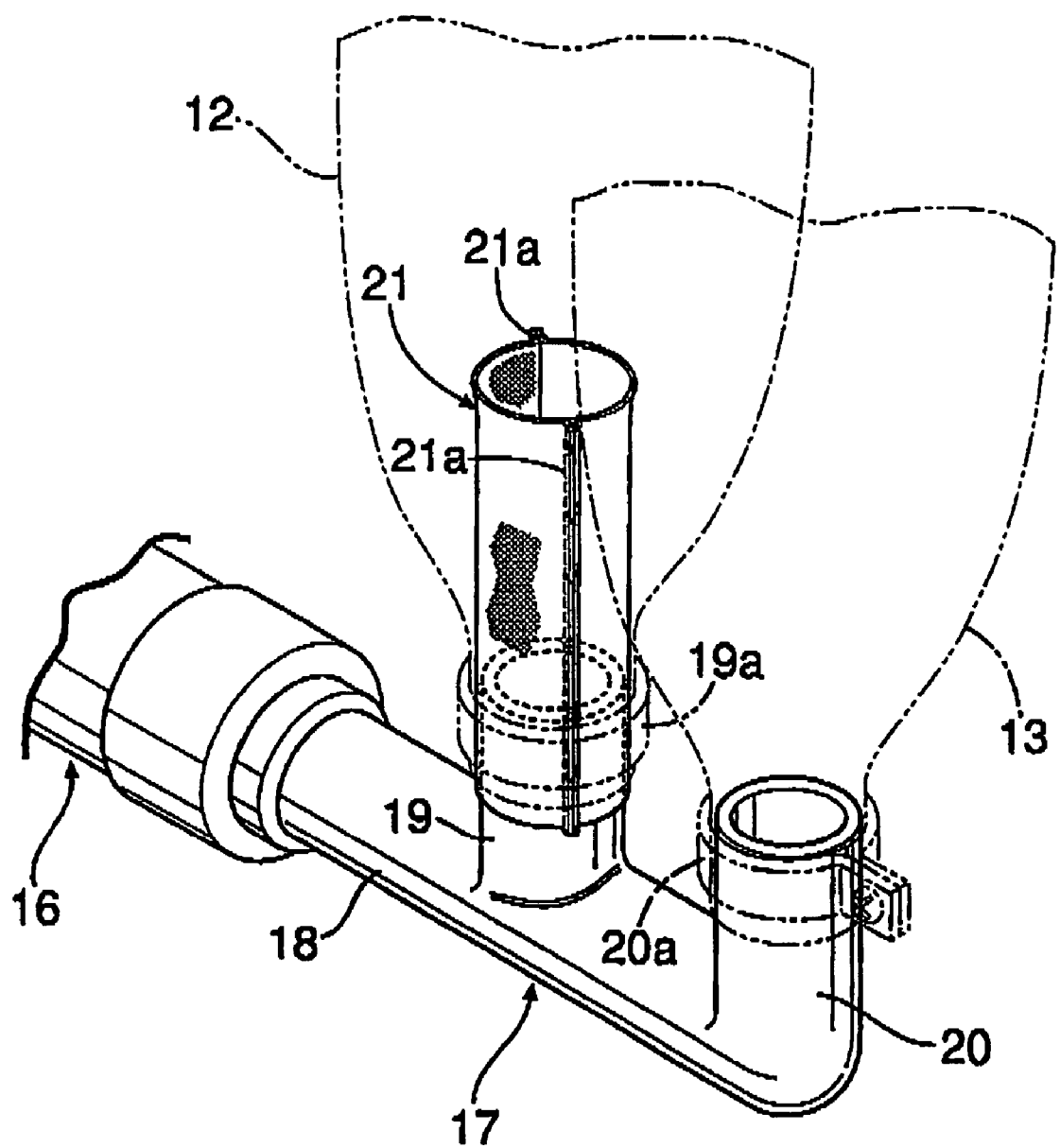

As can be seen in FIGS. 2 and 3, a columnar inflator 16 is fixed to the right side of a front portion of the seat cushion 15. An F-shaped branching pipe 17 is fixed to a front end of the inflator 16. The branching pipe 17 includes a collecting portion 18 extending forwards from the inflator 16, a first branch portion 19 extending upwards from the middle of the collecting portion 18, and a second branch portion 20 extending upwards from a front end of the collecting portion 18. A lower end of a front portion of the first air bag 12 and a lower end of a one-way valve 21 are fitted over an outer periphery of the first branch portion 19 and fixed by a fixing band 19a. A lower end of a front portion of the second air bag 13 is fitted over an outer periphery of the second branch portion 20 and fixed by a fixing band 20a. The one-way valve 21 is formed into a pipe shape by superposing two oblong base fabrics of the same material as base fabrics of the first and second air bags 12 and 13 and sewing opposite side edges of the base fabrics at 21a, 21a. A lower end of the one-way valve 21 is fitted over the first branch portion 19 in a state in which it is covered by an inner periphery of the lower end of the front portion of the first air bag 12.

When an acceleration equal to or larger than a predetermined value is detected upon the side-collision of the vehicle including the side air bag device of the above-described structure, a high-pressure gas generated by the inflator 16 is supplied to the collecting portion 18 of the branching pipe 17, thereby expanding the first and second air bags 12 and 13 connected to the first and second branch portions 19 and 20 diverging from the collecting portion 18. The first and second air bags 12 and 13 break the sewn portions of the skins of the seat back 14 and the seat cushion 15, so that the first air bag 12 is deployed to protect the side of the occupant's waist, and the second air bag 13 is deployed to protect the side of the occupant's breast.

Figure 4A:
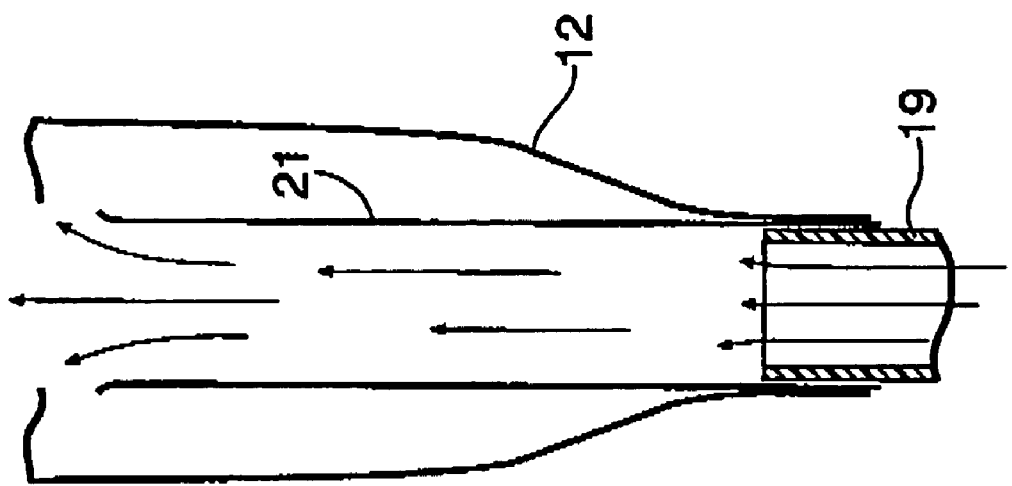
Figure 4B:
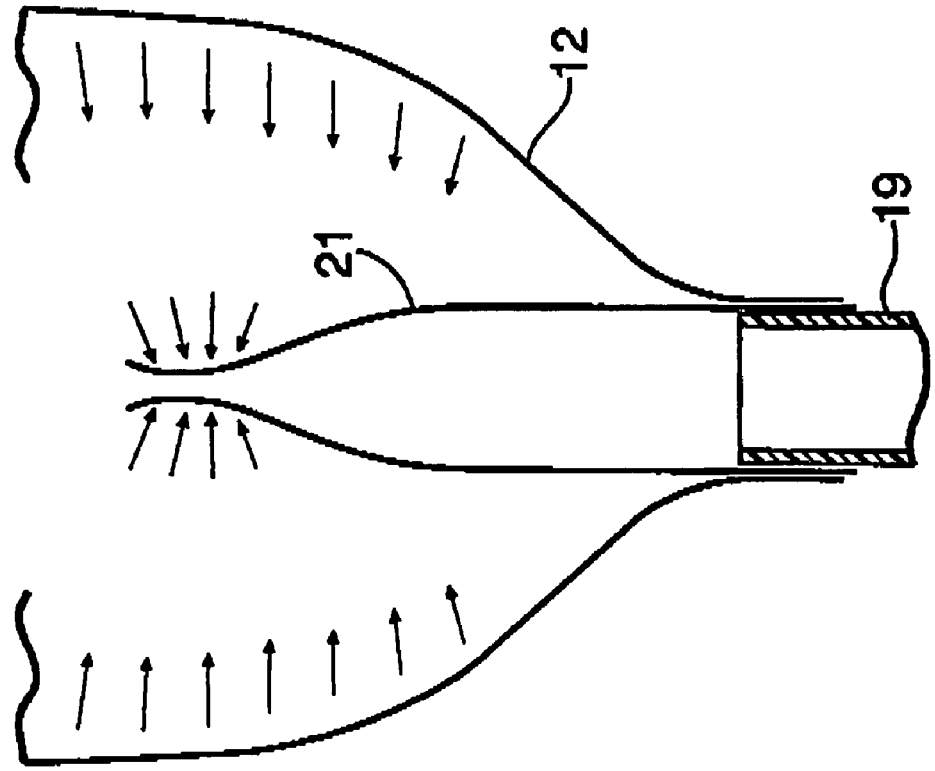
Figure 5:
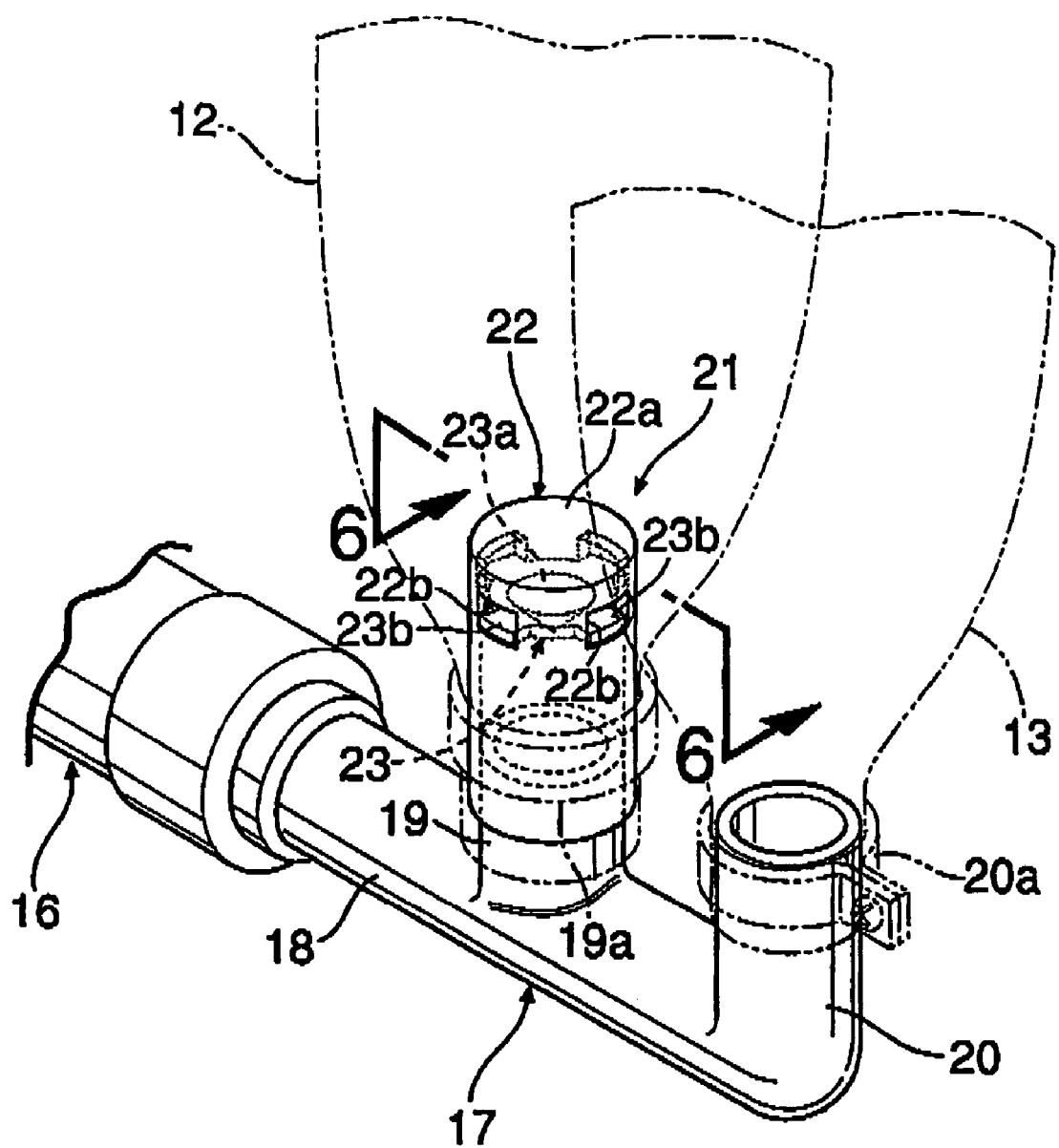
Figure 6:
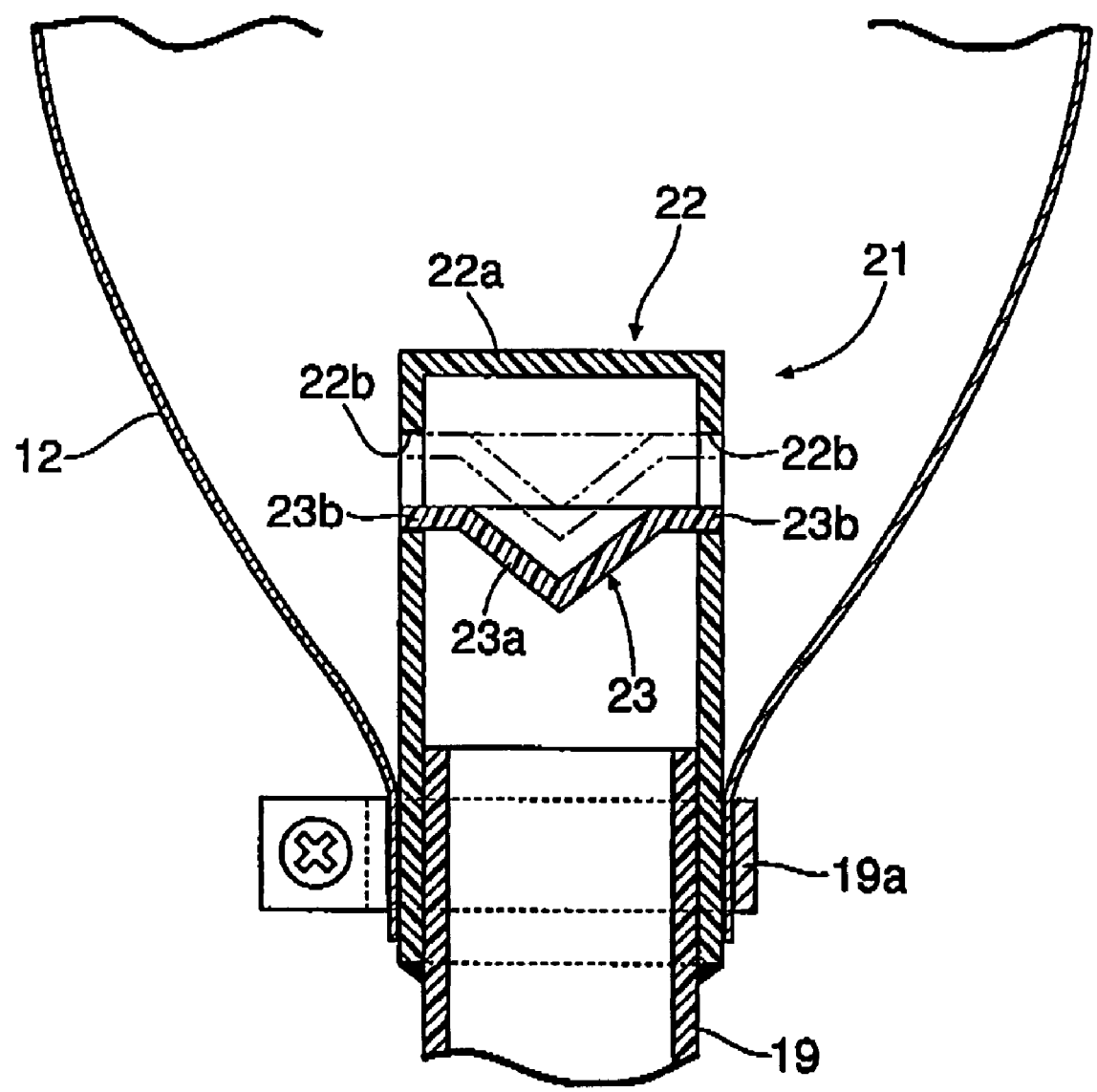

As shown in FIG. 4A, when the first air bag 12 is expanded, the one-way valve 21 is cylindrically expanded to permit the gas to pass therethrough. The internal pressures in the first and second air bags 12 and 13 change in correspondence to occupant restraint loads. When the internal pressure in the second air bag 13 becomes higher than that in the first air bag 12, the one-way valve 21 is opened to transfer the gas in the second air bag 13 into the first air bag 12, as shown in FIG. 4A. When the internal pressure in the first air bag 12 becomes higher than that in the second air bag 13, the one-way valve 21 is crumpled to be closed and inhibits the transfer of the gas in the first air bag 12 into the second air bag 13. As a result, the internal pressure in the first air bag 12 becomes higher than that in the second air bag 13, so that the first air bag 12 abutting against the side of the waist can be made harder than the second air bag 13 abutting against the side of the breast, to thereby effectively restrain the occupant's body. Since the one-way valve 21 is formed by sewing the opposite side edges of the two base fabrics at 21a, 21a, the one-way valve 21 is liable to be flattened and reliably closed.

As described above, the first and second air bags 12 and 13 are mounted in the side air bag device, and the internal pressure in the two air bags 12 and 13 are different from each other, so that a restraint force can be appropriately set in correspondence to a region of the occupant's body. Moreover, the gas generated by the single inflator 16 is diverted by the branching pipe 17 to expand the two air bags 12 and 13, so that it is possible to reduce the number of parts to provide reduction in cost and size, as compared with a case where two inflators are mounted.

A second embodiment of the present invention will now be described with reference to FIGS. 5 to 7B. The second embodiment is different from the first embodiment with respect to the structure of a one-way valve 21 mounted at a first branch portion 19 of a branching pipe 17, but the structure of all the other components is the same as that in the first embodiment.

The one-way valve 21 in the second embodiment is comprised of a cylindrical valve housing 22 closed at its upper end by an upper wall 22a, and a valve member 23 vertically movably disposed in the valve housing 22. The valve member 23 includes a downward-convex conical body 23a and four arm portions 23b protruding radially from an outer periphery of the body 23a. The arm portions 23b are slidably fitted into four quadrilateral openings 22b formed in a side of the valve housing 22.

Figure 7A:
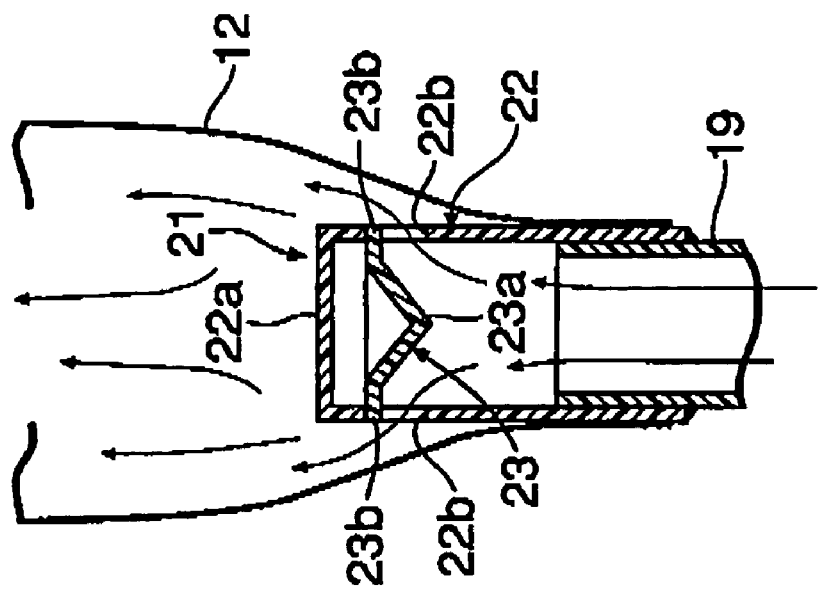
Figure 7B:
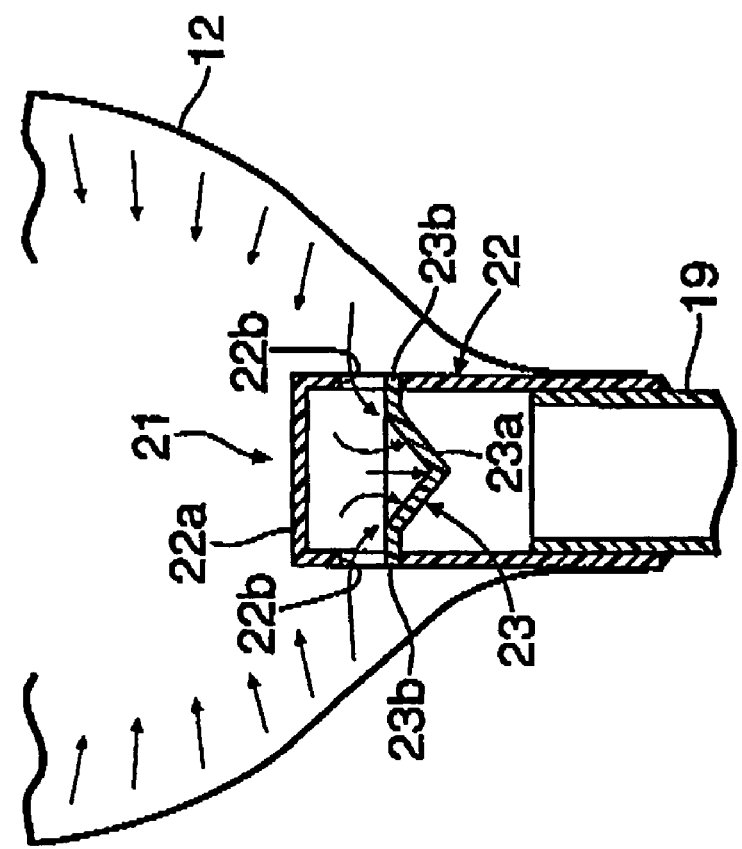

Thus, when the inflator 16 generates the gas and when the internal pressure in the second air bag 13 becomes higher than that in the first air bag 12, the arm portions 23b of the valve member 23 of the one-way valve 21 are guided and moved upwards in the openings 22b of the valve housing 22, as shown in FIG. 7A, so that the gas is supplied through the thus-opened openings 22b into the first air bag 12. On the other hand, when the internal pressure in the first air bag 12 becomes higher than that in the second air bag 13, the arm portions 23b of the valve member 23 of the one-way valve 21 are guided and moved downwards in the openings 22b of the valve housing 22, so that the openings 22b are closed to close the one-way valve 21, whereby the gas in the first air bag is inhibited from moving into the second air bag 13.

According also to the second embodiment, the internal pressure in the first air bag 12 can be increased to be higher than that in the second air bag 13, and the same function and effect as in the first embodiment can be achieved.

Figure 8:
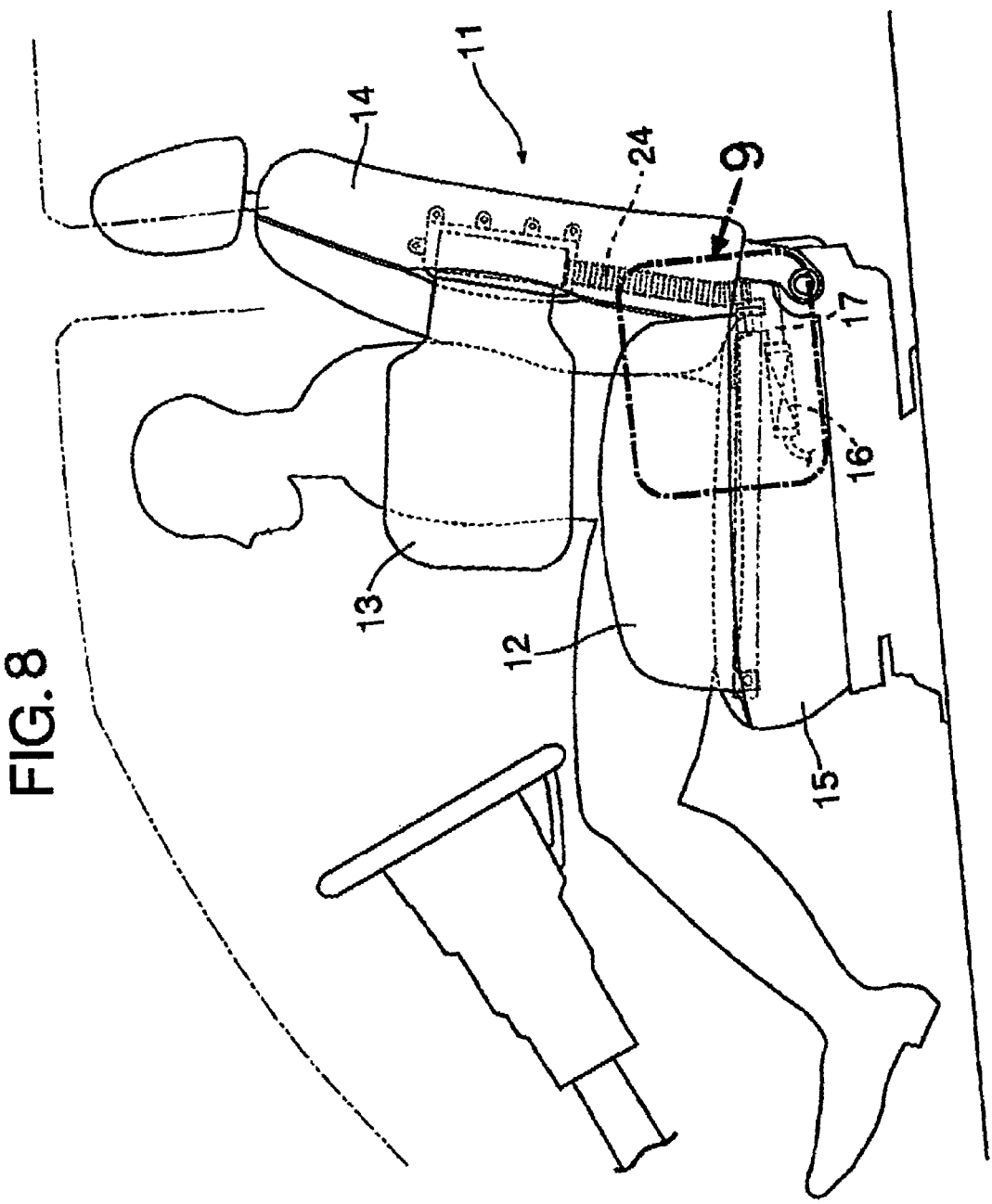
Figure 9:
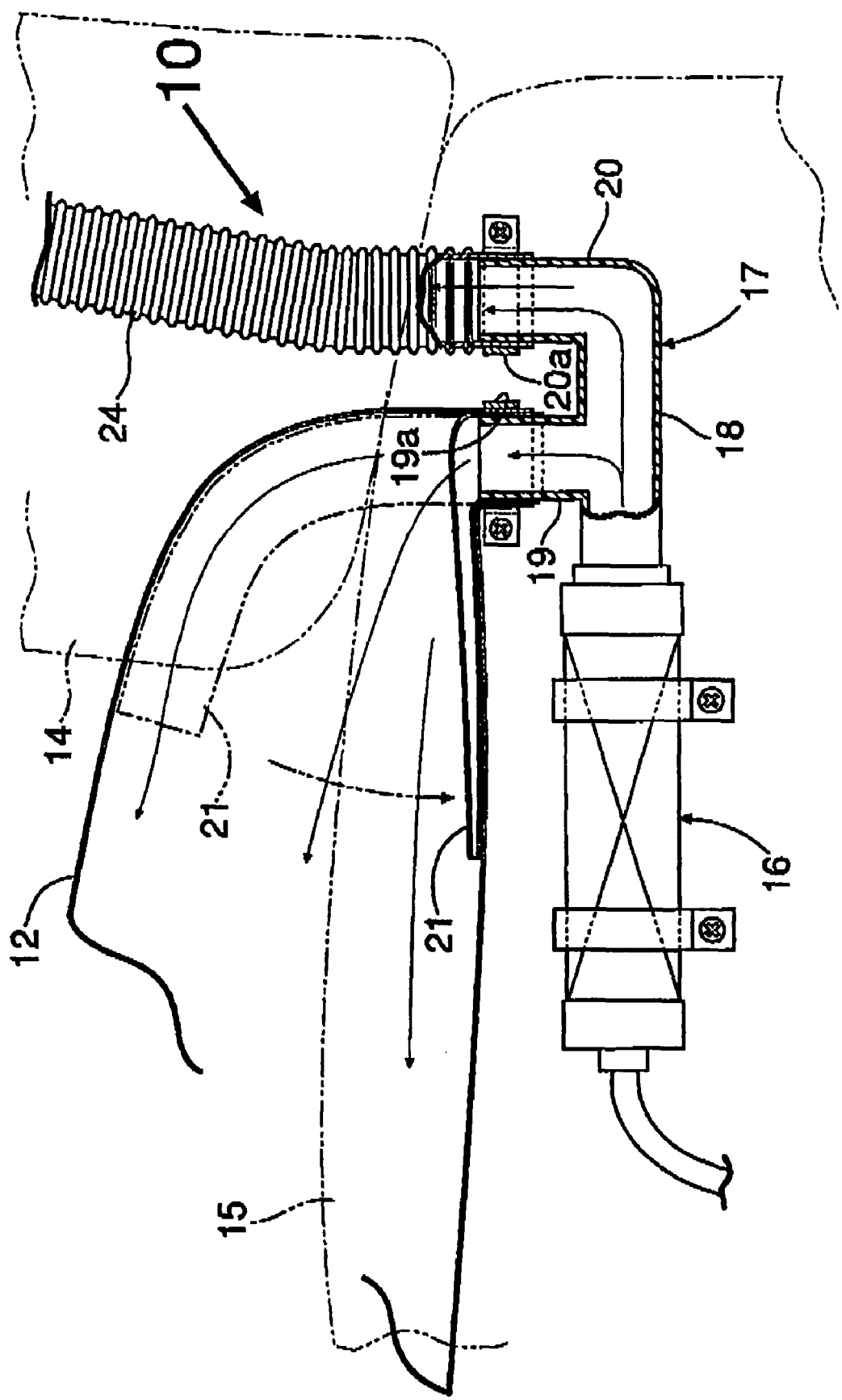
Figure 10:
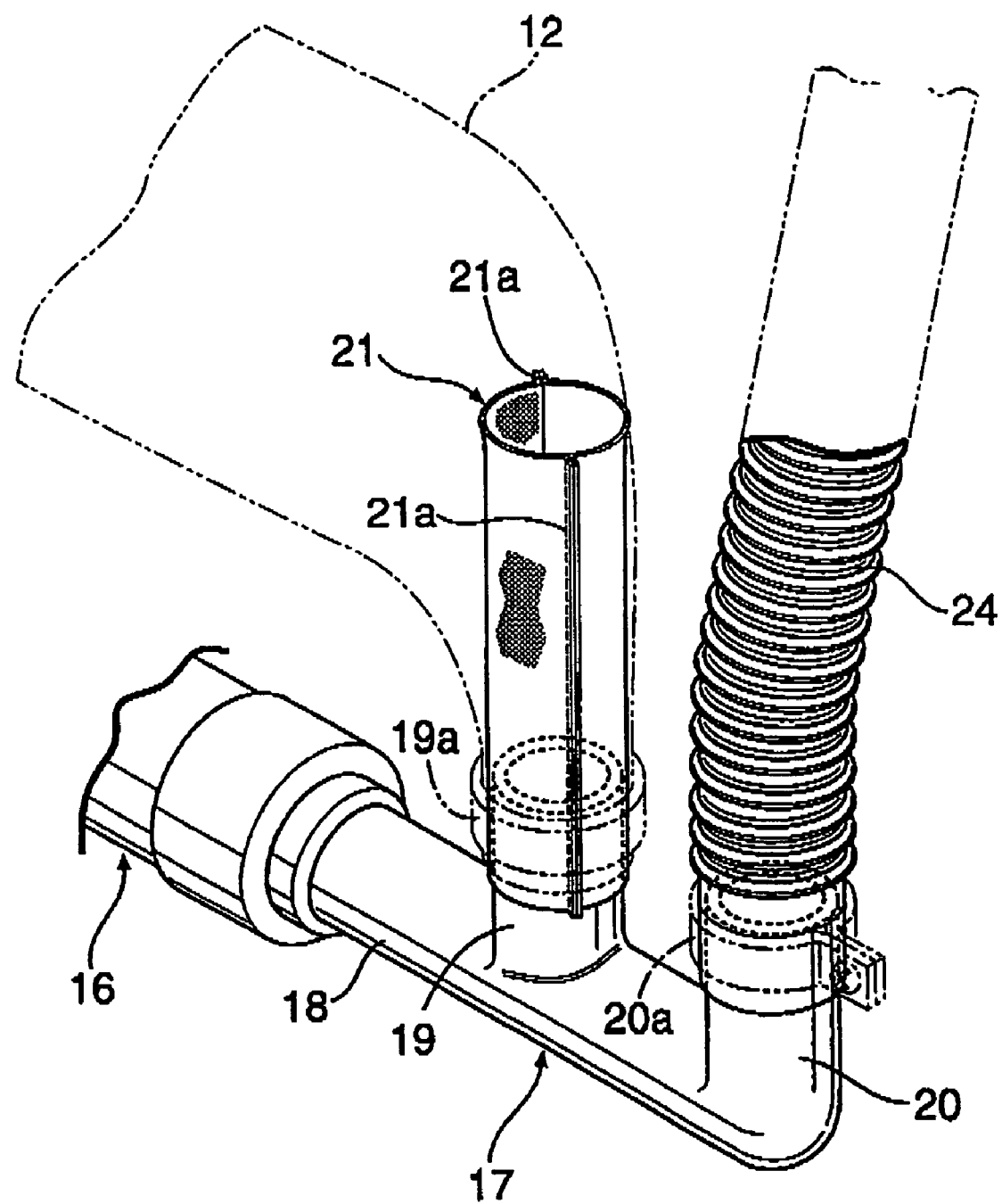

A third embodiment of the present invention will now be described with reference to FIGS. 8 to 10.

In each of the side air bag devices according to the above-described first and second embodiments, the first and second air bags 12 and 13 in the folded states are embedded in and astride the sides of the seat back 14 and the seat cushion 15, and opposite ends of the deployed first and second air bags 12 and 13 extend to connect the seat back 14 and the seat cushion 15 to each other. In the side air bag device according to the third embodiment, a first air bag 12 is deployed upwards from the seat cushion 15 to protect an occupant's waist, and a second air bag 13 is deployed forwards from the seat back 14 to protect an occupant's breast.

A common inflator 16 for deploying the first and second air bags 12 and 13 is disposed in a rear portion of the seat cushion 15, and an F-shaped branching pipe 17 is fixed to a rear end of the inflator 16. The branching pipe 17 includes a collecting portion 18 extending rearwards from the inflator 16, a first branch portion 19 extending upwards from the middle of the collecting portion 18, and a second branch portion 20 extending upwards from a rear end of the collecting portion 18. A rear end of the first air bag 12 and a lower end of a one-way valve 21 are fitted over an outer periphery of the first branch portion 19 and fixed by a fixing band 19a. A lower end of a bellows pipe 24 is fitted over an outer periphery of the second branch portion 20 and fixed by a fixing band 20a. The bellows pipe 24 extends upward within the seat back 14 and is connected to the second air bag 13. The one-way valve 21 is formed into a pipe shape by superposing two base fabrics of the same material as that of the base fabrics of the first and second air bags 12 and 13 and sewing opposite side edges of the base fabrics at 21a, 21a. A lower end of the of the one-way valve 21 is fitted over the first branch portion 19 in a state in which it is covered by an inner periphery of a rear end of the first air bag 12.

According to the third embodiment, in addition to the function and effect in each of the first and second embodiments, even if the reclining angle of the seat back 16 with respect to the seat cushion 15 is changed, the influence to the deployed shapes of the first and second air bags 12 and 13 can be minimized, because the first air bag 12 is supported only in the seat cushion 15 and the second air bag 13 is supported only in the seat back 14.

Moreover, since the first air bag 12 is deployed from the seat cushion 15, even if the first air bag 12 is formed to be longer in a longitudinal direction, the connection thereof with the seat cushion 15 is longer, so that the resisting force of the first air bag 12 to a lateral load becomes large, thereby further effectively restraining the occupant's waist.

A fourth embodiment of the present invention will now be described with reference to FIG. 11.

The fourth embodiment is a modification to the third embodiment. As in the third embodiment, a first air bag 12 is deployed upwards to protect an occupant's waist, and a second air bag 13 is deployed forwards to protect an occupant's breast. However, the first air bag 12 is deployed by a gas supplied from an exclusive inflator 16 mounted in the seat cushion 15, and the second air bag 13 is deployed by a gas supplied from an exclusive inflator 16' mounted in the seat back 14.

Since the first and second air bags 12 and 13 are deployed by the corresponding inflators 16 and 16', respectively, as described above, the internal pressures in the first and second air bags 12 and 13 do not interfere with each other at all and can be set differently from each other with ease.

Although the embodiments of the present invention have been described in detail, it will be understood that various modifications in design may be made without departing from the spirit and scope of the invention defined in the claims.

For example, the side air bag device in each of the embodiments includes the two air bags 12 and 13, but may include three or more air bags.

What is claimed is:

1. A side air bag device for a vehicle comprising:
   a pair of air bags which are accommodated in folded states in a side of a seat for an occupant;
   an inflator communicating with the pair of air bags to expand said air bags by a gas from the inflator said air bags between an inner surface of a side of a vehicle compartment and the occupant upon side collision of the vehicle; and
   a one way valve mounted in an outlet of the inflator communicating with any one of said air bags, thereby inhibiting a back flow of the gas from said one air bag;
   wherein internal pressures in the pair of deployed air bags are different from one another in response to occupant restraint loads.

2. A side air bag device according to claim 1, wherein the gas generated by the single inflator is diverted by a branching pipe and supplied to the pair of air bags.

3. A side air bag device according to claim 1, wherein said side air bag device includes a first air bag deployed to a side of a waist of the occupant, and a second air bag deployed to a side of a breast of the occupant, and the one-way valve is mounted on the outlet of the branching pipe communicating with said first air bag.

4. A side air bag device according claim 1, wherein said side air bag device includes a first air bag deployed to a side of a waist of the occupant, and a second air bag deployed to a side of a breast of the occupant, said first air bag being deployed from a seat cushion, and said second air bag being deployed from a seat back.

* * * * *